US007890443B2

(12) United States Patent
Zhang et al.

(10) Patent No.: US 7,890,443 B2
(45) Date of Patent: Feb. 15, 2011

(54) LEARNING CLASSIFIERS USING COMBINED BOOSTING AND WEIGHT TRIMMING

(75) Inventors: Cha Zhang, Sammamish, WA (US); Paul Viola, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 11/777,482

(22) Filed: Jul. 13, 2007

(65) Prior Publication Data

US 2009/0018981 A1 Jan. 15, 2009

(51) Int. Cl.
*G06N 5/00* (2006.01)
(52) U.S. Cl. ........................................... 706/45
(58) Field of Classification Search .................. 706/45
See application file for complete search history.

(56) References Cited

U.S. PATENT DOCUMENTS

| | | | |
|---|---|---|---|
| 5,793,888 | A | 8/1998 | Delanoy |
| 6,697,504 | B2 | 2/2004 | Tsai |
| 6,804,391 | B1 | 10/2004 | Blake et al. |
| 7,024,033 | B2 | 4/2006 | Li et al. |
| 7,099,510 | B2 | 8/2006 | Jones et al. |
| 7,139,738 | B2 | 11/2006 | Philomin et al. |
| 7,164,781 | B2 | 1/2007 | Kim et al. |
| 2006/0126938 | A1 | 6/2006 | Lee et al. |
| 2006/0248029 | A1 | 11/2006 | Liu et al. |
| 2007/0011119 | A1 | 1/2007 | Thaler |
| 2007/0019863 | A1 | 1/2007 | Ito |

OTHER PUBLICATIONS

Yan, et al, Co-retrieval: a boosted reranking approach for video retrieval, IEE Proceedings, 2005, pp. 888-895.*

Kauchak et al, Sources of Success for Boosted Wrapper Induction, Journal of Machine Learning Research 5, 2004, pp. 499-527.*

Bourdev, L., J. Brandt, Robust object detection via soft cascade, IEEE Comp. Society Conf. on Comp. Vision and Pattern Recognition, Jun. 20-25, 2005, pp. 236-243, vol. 2.

Brubaker, S. C., M. D. Mullin, and J. M. Rehg, Towards optimal training of cascaded detectors, Proc. of ECCV, 2006, pp. 325-337.

Friedman, J., T. Hastie, and R. Tibshirani, Additive logistic regression: A statistical view of boosting, Annals of Statistics, 2000, pp. 337-307, vol. 28.

(Continued)

*Primary Examiner*—Wilbert L Starks, Jr.
(74) *Attorney, Agent, or Firm*—Lyon & Harr, LLP; Mark A. Watson

(57) ABSTRACT

A "Classifier Trainer" trains a combination classifier for detecting specific objects in signals (e.g., faces in images, words in speech, patterns in signals, etc.). In one embodiment "multiple instance pruning" (MIP) is introduced for training weak classifiers or "features" of the combination classifier. Specifically, a trained combination classifier and associated final threshold for setting false positive/negative operating points are combined with learned intermediate rejection thresholds to construct the combination classifier. Rejection thresholds are learned using a pruning process which ensures that objects detected by the original combination classifier are also detected by the combination classifier, thereby guaranteeing the same detection rate on the training set after pruning. The only parameter required throughout training is a target detection rate for the final cascade system. In additional embodiments, combination classifiers are trained using various combinations of weight trimming, bootstrapping, and a weak classifier termed a "fat stump" classifier.

20 Claims, 5 Drawing Sheets

OTHER PUBLICATIONS

Li, S. Z., L. Zhu, Z. Q. Zhang, A. Blake, H. J. Zhang, and H. Shum, Statistical learning of multi-view face detection, Proc. of the 7th European Conf. on Comp. Vision, 2002.

Luo, H., Optimization design of cascaded classifiers, IEEE Comp. Soc. Conf. on Comp. Vision and Pattern Recognition, CVPR'05, 2005, pp. 480-485, vol. 1.

Nowlan, S. and J. Platt, A convolutional neural network hand tracker, Advances in Neural Information Processing Systems 7, 1995, pp. 901-908, San Mateo, CA.

Rowley, H.A., S. Baluja and T. Kanade, Neural network-based face detection, IEEE Trans. on Pattern Analysis and Mach. Intelligence, Jan. 1998, pp. 23-28, vol. 20, No. 1.

Schapire, R. E., and Y. Singer, Improved boosting algorithms using confidence-rated predictions, Machine Learning, 1999, pp. 297-336, vol. 37.

Šochman, J., and J. Matas, Waldboost—Learning for time constrained sequential detection, Proc. of CVPR, 2005.

Sung, K., and T. Poggio, Example-based learning for view-based human face detection, IEEE Trans. on Pattern Analysis and Mach. Intelligence, Jan. 1998, pp. 39-51, vol. 20, No. 1.

Viola, P., and M. J. Jones, Rapid object detection using a boosted cascade of simple features, Proc. of IEEE Conf. on Comp. Vision and Pattern Recognition, 2001.

Viola, P., M. J. Jones, Robust real-time face detection, Int'l J. of Comp. Vision, May 2004, pp. 137-154, vol. 57, No. 2.

Viola, P., J. C. Platt, and C. Zhang, Multiple instance boosting for object detection, Proc. of NIPS, 2006, vol. 18.

Wu, B., H. Ai, C. Huang, and S. Lao, Fast rotation invariant multi-view face detection based on real adaboost, Proc. of IEEE Automatic Face and Gesture Recognition, 2004.

Wu, J., M. D. Mullin, J. M. Rehg, Linear Asymmetric Classifier for cascade detectors, Proceedings of the 22nd Int'l Conf. on Mach. Learning, 2005, vol. 119, pp. 988-995, Bonn, Germany.

Wu, J., J. M. Rehg, and M. D. Mullin, Learning a rare event detection cascade by direct feature selection, Advances in Neural Information Processing Systems, NIPS, 2003.

Xiao, R., L. Zhu, H.-J. Zhang, Boosting chain learning for object detection, 9th IEEE Int'l Conf. on Computer Vision, ICCV'03, 2003, vol. 1.

Michael B. Holmes, U.S. Appl. No. 11/777,471, Notice of Allowance, Apr. 13, 2010.

Adrian L. Kennedy, U.S. Appl. No. 11/777,464, Office Action, Jun. 23, 2010.

Viola, P. and M. Jones, Robust real time object detection, Int'l J. of Comp. Vision, May 2004, pp. 137-154, vol. 57, No. 2, IEEE Computer Society, Washington, DC, USA.

Viola, P., and M. Jones, Rapid object detection using a boosted cascade of simple features, Proc. of the IEEE Comp. Society Conf. on Comp. Vision and Pattern Recognition, Dec. 2001, pp. 511-518, vol. 1, IEEE Computer Society, Washington, DC, USA.

Viola, P., and M. Jones, Fast and robust classification using asymmetric AdaBoost and a detector cascade, Advances in Neural Information Processing System, 2001, pp. 1311-1318, vol. 14, MIT Press.

Ji, C., and S. Ma, Combinations of weak classifiers, IEEE Transactions on Neural Networks, Jan. 1997, pp. 32-42, vol. 8, No. 1, IEEE Computer Society, Washington, DC, USA.

J. Šochman and J. Matas, Inter-stage feature propagation in cascade building with AdaBoost, 17th Int'l Conf. on Pattern Recognition, Aug. 2004, pp. 236-239, vol. 1, IEEE Computer Society, Washington, DC, USA.

Lienhart, R., E. Kuranov and V. Pisarevsky, Empirical analysis of detection cascades of boosted classifiers for rapid object detection, DAGM 25th Pattern Recognition Symposium, Sep. 2003, pp. 297-304, Madgeburg, Germany.

Thompson, S., Pruning boosted classifiers with a real valued genetic algorithm Knowledge-Based Systems, vol. 12, No. 5-6, Oct. 1999, pp. 277-284, Elsevier Science B.V.

* cited by examiner

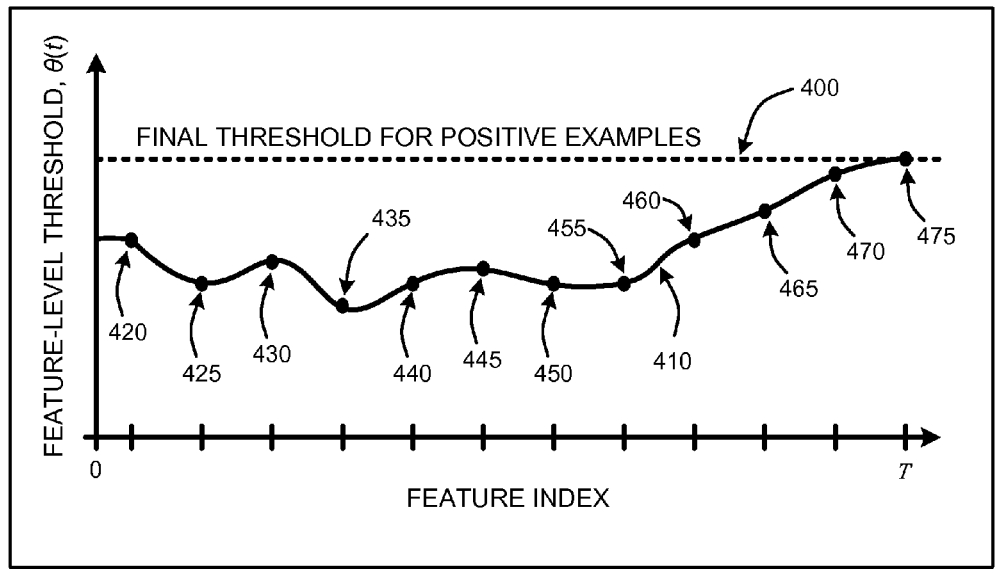
FIG. 4
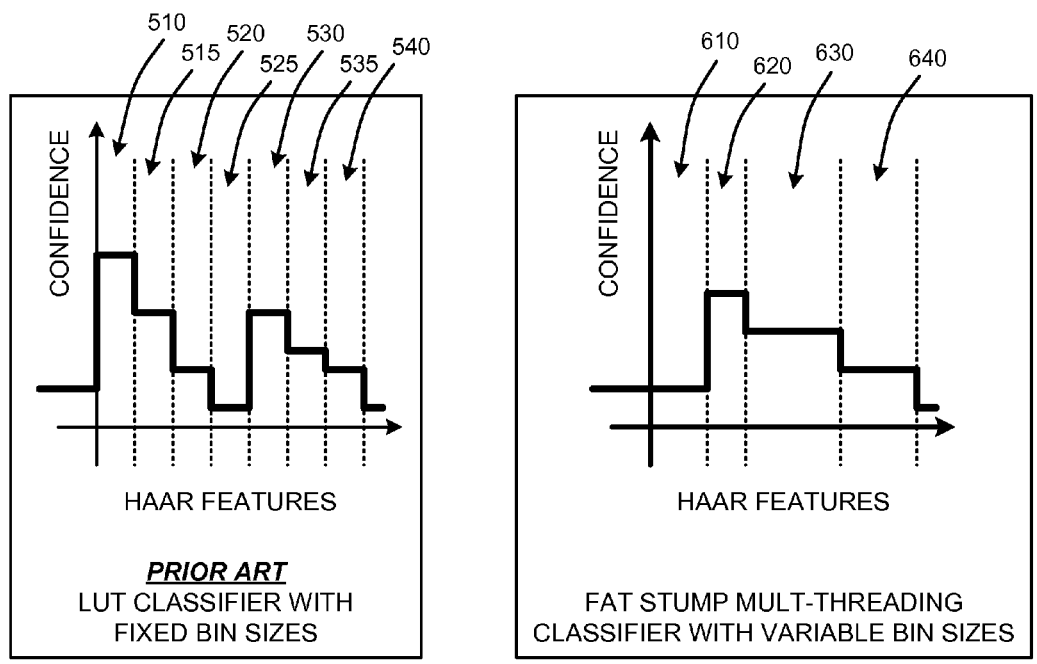
FIG. 5
PRIOR ART
LUT CLASSIFIER WITH FIXED BIN SIZES
FIG. 6
FAT STUMP MULT-THREADING CLASSIFIER WITH VARIABLE BIN SIZES

LEARNING CLASSIFIERS USING COMBINED BOOSTING AND WEIGHT TRIMMING

BACKGROUND

1. Technical Field

The invention is related to classifier-based detection systems, and in particular, to a system and method for efficiently training combination classifiers for use in detecting instances of information of interest within data.

2. Related Art

As is well known to those skilled in the art, there are a large variety of techniques for implementing target detection systems for detecting particular elements or components within a signal. Such detection includes, for example, detection or identification of faces or other specific objects in images, detection of particular words in a speech sample, detection of specific heartbeat patterns in an electrocardiogram signal, etc.

One common detection technique involves the use of hierarchical classifiers, also referred to as "cascade detectors," for use in constructing conventional target detection systems. Cascade detectors have been shown to operate extremely rapidly, with high accuracy, and have important applications such as face detection. Consequently, a great deal of effort has been directed towards cascade learning techniques for improving the training of classifiers used in such detection systems. While use of typical detection systems is typically fast (possibly real-time), initial training of such detection systems is typically very slow. Unfortunately, the process for effectively and efficiently training cascade detectors remains a challenging technical problem with respect to determining optimal cascade stage sizes and target detection rates.

One increasingly important application of cascade-based detection systems involves real-time face detection. For example, one conventional technique involves the use of adaptive boosting, also commonly referred to as "AdaBoost," in combination with an "integral image" for training of the cascaded detector. This detection scheme requires a number of complex parameters, including, for example, the number and shapes of rectangle filters, the number of stages, the number of weak classifiers in each stage, and the target detection rates for each cascade stage. Unfortunately, while this type of system provides good detection results, its computational complexity means that the initial cascade training process requires significant amounts of time (possibly days or weeks, depending upon CPU resources being used), and as such, picking optimal parameters is a difficult task.

The conceptual and computational complexity of generic cascade training processes has led to a number of improvements and refinements of such training. For example, several recent "soft-cascade" based techniques operate by relaxing the original cascade structure of distinct and separate stages so that earlier computation of weak classifier scores can be combined with later weak classifiers. For example, in one such "soft-cascade" approach, the entire detector is trained as a single combination classifier without stages (with hundreds or even thousands of weak classifiers). The score assigned to a detection window by the soft-cascade is simply the sum of the weak classifiers. Computation of the sum is terminated early whenever the partial sum falls below some predetermined threshold.

A related soft-cascade training technique generally operates by setting intermediate thresholds based on an ad hoc detection rate target called a "rejection distribution vector." Like early cascade-based schemes, the soft-cascade of this scheme gradually gives up on a number of positive examples in an effort to aggressively reduce the number of negatives passing through the cascade.

Giving up on some positive examples early in the training process is justified by an understanding that the original combination classifier will eventually give up on some positive examples anyway. The original combination classifier may discard a positive example because it is too difficult to detect, or because reducing the final threshold would admit too many false positives. While it is possible to set the intermediate thresholds so that no positive example is lost, this leads to very conservative thresholds and a very slow detector. The main question is which positive examples can be discarded and when. Unfortunately, one problem with conventional cascade learning approaches is that while many agree that discarding some positive examples is warranted, these schemes fail to provide an efficient or effective mechanism for determining which examples are best to discard.

For example, one conventional training scheme attempts to reject zero positive examples until it becomes impossible to continue, at which point, positive samples are rejected one at a time, as needed. A related scheme defines an exponential curve which determines the number of faces that can be discarded at each stage. Any positive example falling outside this somewhat arbitrary curve is simply discarded. Yet another conventional scheme uses a ratio test to determine rejection thresholds. While this scheme has some statistical validity, the distributions must be estimated (which introduces empirical risk). Each of these schemes has advantages and disadvantages that generally result in a tradeoff between various factors including target detection rates, target detection speed, and classifier training speed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Classifier Trainer," as described herein, uses one or more sets of training data to construct a "pruning classifier" comprising a series of weak classifiers and associated intermediate rejection thresholds for detecting instances of particular information in data (e.g., faces in images, particular words in speech, patterns in a signal, particular documents on the Internet, instances of queries collected by a search engine, books in a database, products in a shopping database, etc.). This pruning classifier is constructed from an original combination classifier that has been trained on one or more data sets using some conventional training technique. Construction of the pruning classifier is achieved by learning individual or intermediate rejection thresholds for each weak classifier of the original combination classifier. In additional embodiments, pruning classifier training includes the use of various combinations of weight trimming, bootstrapping, and a novel weak classifier termed a "fat stump" classifier.

In general, given a successfully trained combination classifier comprising a plurality of weak classifiers, intermediate rejection thresholds are learned for each weak classifier and used to construct the final pruning classifier which is then used in place of the original combination classifier. The term "pruning classifier" is used since the intermediate rejection thresholds are learned by iteratively "pruning" a number of positive examples or windows representing instances of information in training data for some or all of the weak classifiers of the original combination classifier. Once learned, these intermediate rejection thresholds are then used to prune (i.e., to reject) positive examples from actual (i.e., non-training) data that is provided to the pruning classifier.

For example, in one embodiment, the intermediate rejection thresholds are learned using a multi-stage pruning process (referred to herein as "multiple instance pruning" (MIP), which ensures that every object detected by the original combination classifier is also detected by the trained pruning classifier, thereby guaranteeing that the detection rate on the training set is unchanged after pruning. Moreover, the false positive rate of the pruning classifier will be no higher than the original combination classifier on the training set. The only parameter required throughout training is a target detection rate for the final pruning classifier which provides a final threshold for setting a false positive/false negative operating point. Consequently, the training process provided by the Classifier Trainer is fully automatic and requires no assumptions of probability distributions, statistical independence, or ad hoc intermediate rejection targets.

The Classifier Trainer described herein addresses issues relating to determining optimal cascade stage sizes and target detection rates. Specifically, the MIP techniques described herein for training pruning classifiers provides a set of rejection thresholds which aggressively terminate computation with no reduction in detection rate or increase in false positive rate, relative to the original training data. Consequently, one clear advantage of the Classifier Trainer is that the use of the learned intermediate thresholds of the final pruning classifier provides significantly improved detection speeds relative to the original combination classifier by improving the overall efficiency of the pruning classifier relative to the original combination classifier. Further, overall detection capabilities of the pruning classifier are highly accurate.

In view of the above summary, it is clear that the Classifier Trainer described herein provides a unique system and method for training weak classifiers by automatically learning intermediate rejection thresholds for use in a pruning classifier based detector system. In addition to the just described benefits, other advantages of the Classifier Trainer will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 4 provides an exemplary lower envelope for computed for weak classifiers of a combination classifier for use in pruning examples for accelerating classifier detection performance, as described herein.

FIG. 5 provides an example of a conventional prior art look-up table (LUT) classifier using Haar features having fixed bin sizes, as described herein.

FIG. 6 provides an example of a "fat stump" multi-threading classifier using Haar features and a variable bin size, as described herein.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
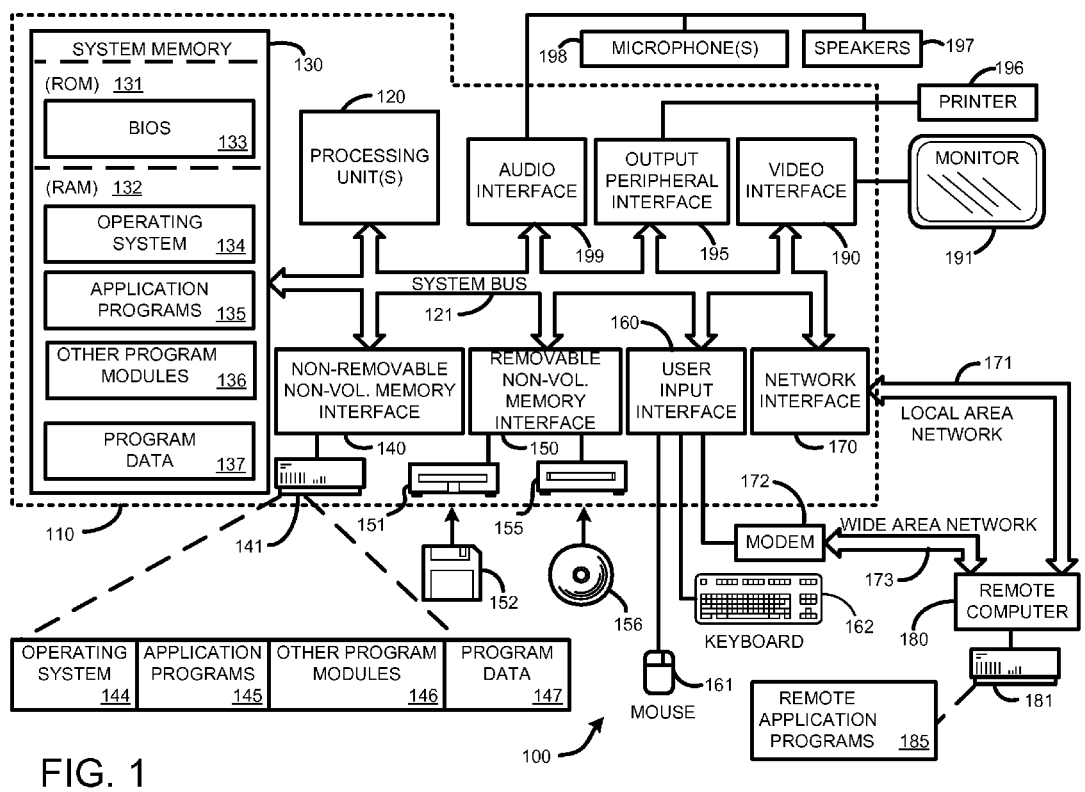
FIG. 1 is a general system diagram depicting a general-purpose computing device constituting an exemplary system for use in implementing a "Classifier Trainer," as described herein.
Figure 2:
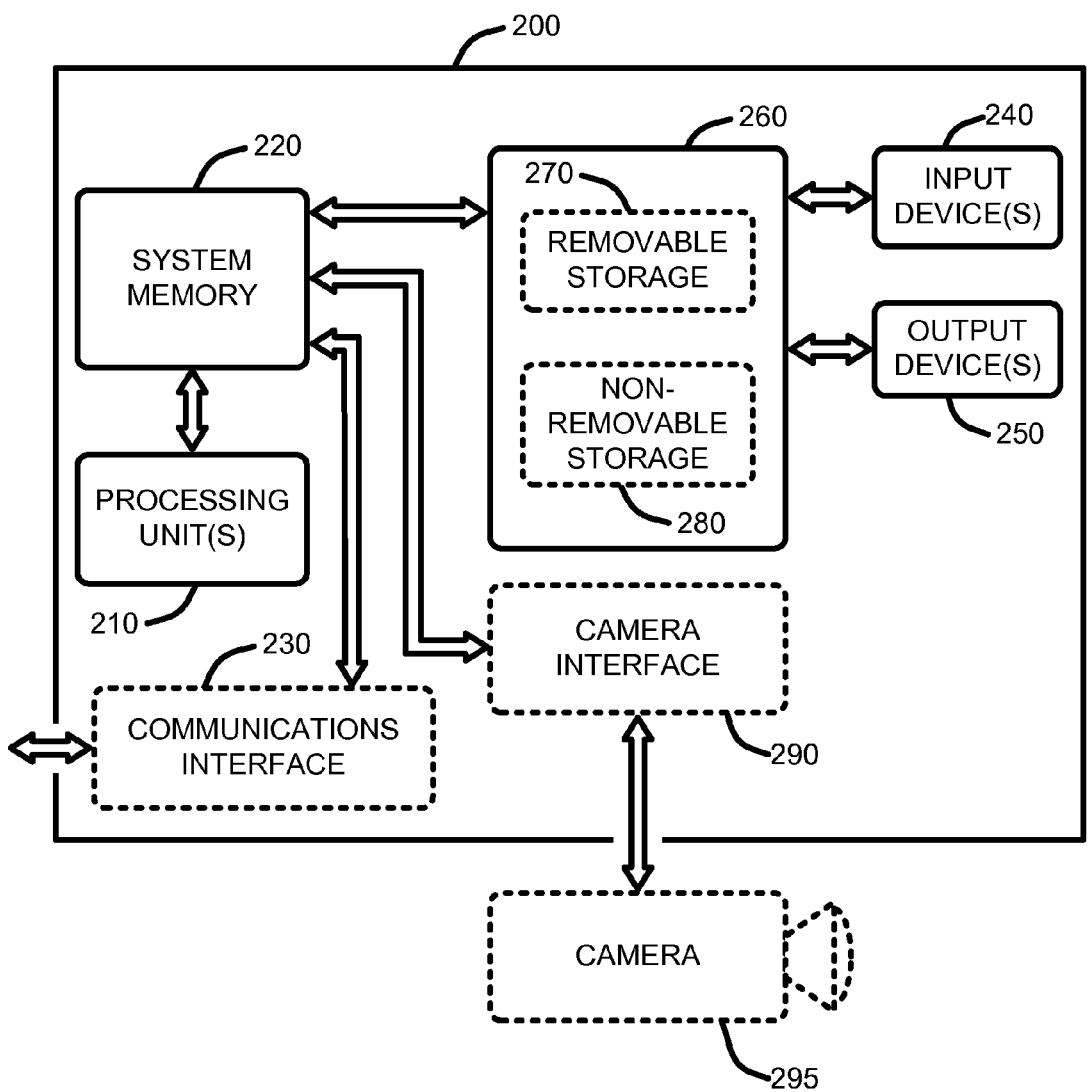
FIG. 2 is a general system diagram depicting a general device having simplified computing and I/O capabilities for use in implementing a "Classifier Trainer," as described herein.

1.0 Exemplary Operating Environments:

FIG. 1 and FIG. 2 illustrate two examples of suitable computing environments on which various embodiments and elements of a "Classifier Trainer," as described herein, may be implemented.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, a camera 192 or other image capture device may also e coupled to computer 110 via the video interface 190 or other input. Computer 110 may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface or input device for receiving spatially coherent variable-rate multidimensional data, such as, for example, vector graphic images. Such devices include, for example, cell phones, PDA's, media players, handheld, laptop or portable computers, handheld or portable electronic gaming devices, etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to implement the functionality of the Classifier Trainer, the device must have some minimum computational capability, some storage capability, and an interface for allowing input of training data. In addition, this simplified computing device may also include an output device for outputting a trained detection system, as described in detail below.

In particular, as illustrated by FIG. 2, the computational capability is generally illustrated by processing unit(s) 210 (roughly analogous to processing units 120 described above with respect to FIG. 1). Further, the simplified computing device of FIG. 2 may also include a camera interface 290 for use in capturing training or test images via a camera 295. Note that in contrast to the processing unit(s) 120 of the general computing device of FIG. 1, the processing unit(s) 210 illustrated in FIG. 2 may be specialized microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). The simplified computing device of FIG. 2 also includes storage 260 that is either removable 270 and/or non-removable 280 (analogous to the storage devices described above with respect to FIG. 1).

The exemplary operating environment having now been discussed, the remaining part of this description will be devoted to a discussion of the program modules and processes embodying a "Classifier Trainer" which provides a process for training weak classifiers by automatically learning intermediate rejection thresholds for use in a "pruning classifier" based target detection system.

2.0 Introduction:

A "Classifier Trainer," as described herein, constructs a trained pruning classifier for use in detecting specific instances of information in data (e.g., faces in images, particular words in speech, patterns in a signal, particular documents on the Internet, instances of queries collected by a search engine, books in a database, products in a shopping database, etc.). This pruning classifier is constructed from an original combination classifier that has itself been successfully trained on one or more original data sets using any desired training process, conventional or otherwise. The resulting pruning classifier provides significantly improved detection speeds relative to the original combination classifier while maintaining high levels of detection accuracy.

In general, the original combination classifier includes a plurality of weak classifiers. Depending upon the complexity of the original combination classifier, there may be hundreds or even thousands of individual weak classifiers. In one embodiment, the Classifier Trainer uses a technique referred to herein as "multiple-instance pruning" (MIP) to learn individual rejection thresholds for each weak classifier of the original combination classifier. These learned intermediate rejection thresholds are then used in constructing the aforementioned pruning classifier. In additional embodiments, pruning classifier training includes the use of various combinations of weight trimming, bootstrapping, and a novel weak classifier termed a "fat stump" classifier.

The aforementioned MIP process enables the Classifier Trainer to learn intermediate rejection thresholds using a technique which ensures that every instance of information detected by the original combination classifier is also detected by the trained pruning classifier, thereby guaranteeing that the detection rate on the training set is unchanged after pruning. Moreover, the false positive rate of the pruned detector will be no higher than the original combination classifier on the training set. The only parameter required throughout training is a target detection rate for the final detection system which provides a final threshold for setting a false positive/false negative operating point. Consequently, the training process is fully automatic and requires no assumptions of probability distributions, statistical independence, or ad hoc intermediate rejection targets.

2.1 System Overview:

As noted above, the Classifier Trainer described herein operates to learn rejection thresholds for individual weak classifiers of a previously trained combination classifier. In general, as is known to those skilled in the art, each weak classifier in an overall combination classifier sequentially examines "examples" or "windows" drawn from each data element in a set of training data to determine a confidence level as to whether the particular example or window being examined includes an instance of some particular target or other information of interest that is being searched for in the training data. A final "score" for each example or window is generally the sum of the confidence levels of all of the weak classifiers. Where the final score exceeds some detection threshold, the particular example or window is identified as including a detected instance of the target or information of interest being searched for by the combination classifier.

For example, to use face detection for purposes of discussion, each "window" represents some region of an image that is tested for the presence of a face (i.e., an "instance" of a face). Typically, with conventional face detection, such regions are rectangular, but may be any desired shape. When initially training a face detection system, a very large number of windows (also referred to as "examples"), typically having different sizes and positions and typically fully or partially overlapping many other windows, are generally selected for each image and processed by each of the weak classifiers of the overall combination classifier.

The individual weak classifiers of this type of conventional detection system are typically initially trained on very large sets of training data, relative to ground truth points for known instances and positions of faces in the images comprising the training data. Training is generally a relatively slow process. However, once trained, these weak classifiers represent the overall combination classifier that is then made available for use in evaluating actual data (i.e., live or recorded images) for detecting faces in that data. One of the factors in the overall detection speed of this type of trained system is the number of weak classifiers that must evaluate the actual data for detecting faces.

In general, given a successfully trained combination classifier comprising a plurality of weak classifiers, the Classifier Trainer operates to learn intermediate rejection thresholds that are then used to construct the final pruning classifier. This pruning classifier is then used in place of the original combination classifier. In particular, in one embodiment, the intermediate rejection thresholds are learned using a multi-stage pruning process which ensures that every target or particular instance of information detected by the original combination classifier is also detected by the pruning classifier produced by the Classifier Trainer, thereby guaranteeing that there is no reduction on the detection rate and no increase on the false positive rate on the training set after pruning.

In other words, the learned intermediate rejection thresholds allow the pruning classifier produced by the Classifier Trainer to aggressively terminate target detection computations, whenever possible, with no reduction in detection rate or increase in false positive rate, relative to the original training data. This termination represents a "pruning" of windows or examples being evaluated for instances of the target or information being searched for. Consequently, the earlier that a window or an example can be pruned from further computation, the faster the overall detection system will be.

In general, the Classifier Trainer operates by using training data (which may or may not be the same as used to train the original combination classifier) to learn the intermediate rejection thresholds after the original combination classifier has been trained. There are no assumptions about probability distributions, statistical independence, or ad hoc intermediate targets for detection rate (or false positive rate). The basic pruning approach is based on the following observations: 1) positive examples (e.g., windows corresponding to an instance of the target being searched for) that are discarded by the original combination classifier can be safely discarded during pruning; and 2) each ground-truth instance of information (e.g., a face in an image) requires no more than one matched example or detection window to maintain the detection rate of the original combination classifier.

More specifically, by examining a "path" of every positive example or window of the training data through the complete series of weak classifiers, the Classifier Trainer is able to determine an "envelope" for positive examples (i.e., examples testing positive for target detection). In one embodiment, the envelope is represented by a lower bound that is computed from scores or confidence levels at every individual weak classifier.

For example, every positive window passing through a particular weak classifier will have a particular score or confidence level for that weak classifier. Therefore, by determining a minimum score for any positive example passing through a particular weak classifier, it can be said that no positive example having a lower score ever passed through that weak classifier during training of the overall combination classifier. Consequently, this information can be used to set minimum rejection thresholds for each weak classifier such that any example or window passing through a weak classifier will be immediately pruned from further consideration if the confidence level for that window is below the rejection threshold for that particular weak classifier. Note that specific details of this pruning process are discussed in further detail in Section 3.

It should be noted that the following discussion generally refers to face-detection systems for detecting faces in images. However, the discussion of face detection in images is only intended to provide an exemplary context for use and operation of the Classifier Trainer. In fact, in view of the following discussion, it should be clear that the Classifier Trainer is not intended to be limited to the use of images or of face detection systems, and that any type of data can be evaluated for identifying particular instances of targets or other information of interest by learning appropriate intermediate rejection thresholds for constructing a pruning classifier from a previously trained combination classifier.

Figure 3:
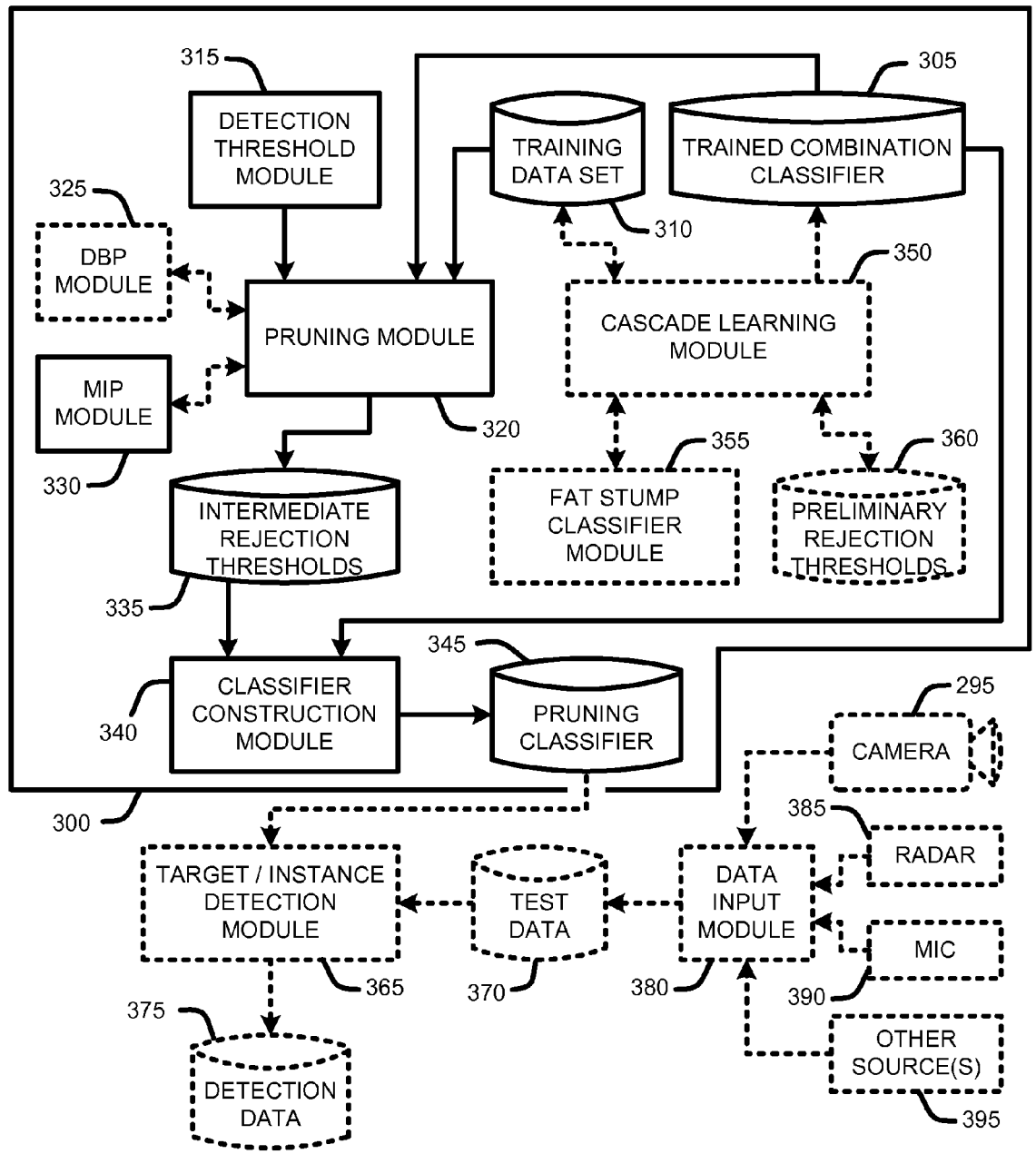
FIG. 3 provides an exemplary architectural flow diagram that illustrates program modules for implementing the Classifier Trainer, as described herein.

2.2 System Architectural Overview:

The processes summarized above are illustrated by the general system diagram of FIG. 3. In particular, the system diagram of FIG. 3 illustrates the interrelationships between program modules for implementing the Classifier Trainer, as described herein. It should be noted that any boxes and interconnections between boxes that are represented by broken or dashed lines in FIG. 3 represent alternate embodiments of the Classifier Trainer described herein, and that any or all of these alternate embodiments, as described below, may be used in combination with other alternate embodiments that are described throughout this document.

In general, as illustrated by FIG. 3, the Classifier Trainer 300 begins operation by receiving and providing a previously trained combination classifier 305 and a training data set 310 to a pruning module 320. Note that this training data set 310 is preferably the same data set that was used for initial training of the original combination classifier 305, but there is no requirement for this data to be the same as that used for initial training of the combination classifier. In addition, a final detection threshold for the original combination classifier 305 is set to a desired level via a detection threshold module. This final detection threshold is also provided to the pruning module 320.

As described in further detail in Section 3.2 and Section 3.3, the pruning module 320 then evaluates the individual weak classifiers of the original combination classifier 305 in combination with windows or examples from the training data set to determine which windows or examples can be pruned and what thresholds for pruning can be set for each of the individual weak classifiers. In various embodiments, the pruning module 320 performs the aforementioned pruning process by employing either a direct backward pruning (DBP) module 325 or a multiple instance pruning (MIP) module 330 for pruning windows and determining rejection thresholds.

After evaluating the training data set 310, the pruning module 320 outputs a set of intermediate rejection thresholds 335 which are then combined with the original combination classifier 305 by a classifier construction module 340 to construct a pruning classifier 345 that is then stored for later use, as desired.

As noted above, the pruning module 320 uses a previously trained combination classifier 305 in combination with a detection threshold and the training data set 310. While any conventionally trained cascade detector 305 can be used by the Classifier Trainer 300, in one embodiment, the Classifier Trainer uses a cascade learning module 350 to learn a novel combination classifier 305 comprising the use of novel weak classifiers termed "fat stump" classifiers. These fat-stump classifiers are learned using an iterative process performed by a fat stump classifier module 355 as described in further detail in Section 3.5. Further, as discussed in Section 3.4, in one embodiment, the cascade learning module 350 uses a combination of weight trimming and bootstrapping in combination with automatically learned fat stump classifiers to construct the combination classifier 305 along with a set of conservative preliminary rejection thresholds 360.

In either case, regardless of whether the original combination classifier 305 is learned using either conventional or fat-stump classifier based techniques, the resulting pruning classifier 345 is available for use in conventional classifier based detection systems. For example, in one embodiment, once constructed, the pruning classifier 345 is provided to a target/instance detection module that evaluates a set of test data 370 that is either live or previously recorded. The target/instance detection module 365 then evaluates the test data 370 via the pruning classifier 345 and outputs a set of detection data 375 that includes target or instance detection information relative to the set of test data 370.

Clearly, detection systems, such as that briefly described with respect to the target/instance detection module 365 are used in a wide variety of detection operations, and with a wide variety of data types. Therefore, in one embodiment, a data input module 380 is used to receive the test data 370 from one or more sources, such as, for example, a camera 295, a radar or radar array 385, a microphone or microphone array, or any other sources 395 that generate or receive data compatible with the target detection criteria for which the pruning classifier 345 has been trained. Typically, the type of data received by the data input module 380 will be of the same type as the training data set 310.

3.0 Operation Overview:

The above-described program modules are employed for implementing the Classifier Trainer. As summarized above, the Classifier Trainer operates to learn rejection thresholds for each of the individual weak classifiers of a previously trained combination classifier to construct a pruning classifier. The following sections provide a detailed discussion of the operation of the Classifier Trainer, and of exemplary methods for implementing the program modules described in Section 2 with respect to FIG. 3.

3.1 Operational Details of the Classifier Trainer:

The following paragraphs detail specific operational and alternate embodiments of the Classifier Trainer described herein. In particular, the following paragraphs describe direct backwards pruning based on the final example classification of the original combination classifier; multiple instance pruning based on the final example classification of the original combination classifier; weight trimming and bootstrapping for improving cascade learning; and "fat stump" classifiers.

3.2 Pruning Using the Final Classification:

In general, as noted above, the Classifier Trainer learns intermediate rejection thresholds based on a final classification (i.e., positive or negative) for each example or window passing through the series of weak classifiers of the original combination classifier. These intermediate thresholds are set so that they prune, as early as possible, those positive examples/windows which are discarded by the original combination classifier. By processing the original training data in this manner for learning the intermediate rejection thresholds for each weak classifier, the Classifier Trainer produces the pruning classifier. Similarly, any examples being evaluated by the resulting pruning classifier with respect to actual (i.e., non-training) test data will also be aggressively pruned, thereby resulting in a faster overall classification of the test data.

For example, as illustrated by FIG. 4, a final rejection 400 threshold of the original combination classifier is used in combination with the training data set to construct a rejection "envelope" comprising a minimum rejection threshold (420 through 475) for each of the weak classifiers of the pruning classifier constructed by the Classifier Trainer. As described in further detail below, this envelope represents a trajectory along which no positive example having a lower score ever passed through any weak classifier. As described below, and in Section 3.3 with respect to the aforementioned MIP-based pruning, the intermediate rejection thresholds (420 through 475) are determined using various pruning-based embodiments.

In particular, the score, $s_k(t)$, of each example or window drawn from the training data can be considered a "trajectory" or "path" through time as the window passes through the series of T weak classifiers comprising the original combination classifier. The original combination classifier rejects a positive example if its final score $s_k(T)$ falls below a final threshold, $\theta(T)$. In the simplest embodiment for setting intermediate rejection thresholds, all trajectories from positive windows which fall below the final threshold are removed. The threshold for each weak classifier is then simply computed by determining the score observed at each weak classifier given the complete set of positive examples that pass the final threshold, $\theta(T)$. In particular, as illustrated by Equation 1, the intermediate rejection thresholds, $\theta(t)$, in this first embodiment are computed as follows:

$$\theta(t) = \min_{\{k | s_k(T) > \theta(T), y_k = 1\}} s_k(T) \qquad \text{Equation 1}$$

where $\{x_k, y_k\}$ is the training set in which $y_k=1$ indicates positive windows and $y_k=-1$ indicates negative windows for a particular example $x_k$. These intermediate rejection thresholds produce a very fast pruning classifier which is guaranteed to produce no more errors than the original combination classifier (with respect to the original training data). This pruning embodiment is referred to herein as "direct backward pruning" (DBP).

One difference between this DPB-based pruning approach and conventional pruning approaches is that conventional approaches set intermediate thresholds to reject the largest number of negative examples while attempting to limit the percentage of positive examples that are rejected relative to the original combination classifier.

In contrast, the DPB-based pruning approach adjusts the final threshold of the original combination classifier to reject the largest number of negative examples while achieving some detection rate target. The Classifier Trainer then learns the intermediate rejection thresholds such that the resulting pruning classifier rejects the largest number of negative examples and none of the positive examples which are retained by the original combination classifier. Consequently, unlike conventional schemes, any particular positive examples which are rejected by the resulting pruning classifier are only those which are destined to be rejected by the original combination classifier.

Consequently, this process yields a fast classifier which labels all positive examples in exactly the same way as the original combination classifier. In fact, it yields the fastest possible pruning classifier which retains the same positive examples as the original combination classifier (if the weak classifiers are not reordered). Further, it should be noted that some negative examples that eventually pass the original combination classifier threshold are often pruned by the intermediate rejection thresholds learned by the Classifier Trainer.

This provides the additional benefit of reducing false positive rates in the resulting pruning classifier. Note that in one embodiment, the weak classifiers trained via the above described DBP-based pruning can be reordered, if desired, although this may impact the pruning of some examples.

In general, the intermediate rejection thresholds are learned using a large set of training examples (with one or more examples corresponding an instance of particular information in the training data) drawn from a large set of images (or other data). However, for purposes of explanation, this basic process will be described with respect to a single image having a single face. For example, given the case of a single image, a single physical face in that image will correspond to a set of positive detection windows that are within some acceptable range of positions and scales. Typically there are a large number of acceptable windows for each face (i.e., each "instance"). The "trajectories" of each positive window through the series of weak classifiers correspond to acceptable windows which ultimately fall above the final detection threshold, $\theta(T)$ of the original combination classifier. Since these "acceptable" windows are the ones retained by the original combination classifier, only the trajectories of these acceptable windows are used to compute the intermediate rejection thresholds.

In view of this capability of the Classifier Trainer, it can be said that the original combination classifier, along with a threshold, $\theta(T)$, for setting an operating point, provides labels on examples which are more valuable than the ground-truth labels of the faces being detected. In particular, there will always be a set of "positive" examples which are extremely difficult to detect, or worse, which are mistakenly labeled positive (i.e., "false positives"). In practice the final threshold, $\theta(T)$, of the original combination classifier will be set so that these particular examples are rejected. However, in the DBP-based pruning approach described above, these particular examples can be rejected extremely early in the computation of the overall cascade. This can yield a very significant increase in speed with no loss in classification accuracy.

3.3 Multiple Instance Pruning:

Note that the following discussion generally describes detection of faces in images. However, as noted above, the Classifier Trainer described herein is more generally capable of detecting specific instances of particular information in some data or set of data. Examples include detection of faces in images, particular words in speech, patterns in a signal, particular documents on the Internet, instances of queries collected by a search engine, books in a database, products in a shopping database, etc. Therefore, it should be understood that the following discussion regarding face detection in images is intended only as an example to provide a better understanding of the operation of various embodiments of the Classifier Trainer.

The notion of an "acceptable detection window" plays a critical role in an improved process for setting final rejection thresholds. In particular, it is generally difficult to define the correct position and scale of a face in an image. For a purely upright and frontal face some agreement can generally be found regarding the smallest rectangle which includes the chin, forehead, and the inner edges of the ears. However, as a range of non-upright and non-frontal faces is included, these rectangles can vary quite a bit. Note that in the case of face detection, where the same face will typically result in multiple positive windows or examples, this represents a case of "multiple-instance" detection of the same target.

For example, one factor that can be considered in setting final rejection thresholds is whether the ground-truth window position and scale should be defined as a function of apparent head size. Alternately, another factor to consider is whether eye position and inter-ocular distance is a more reliable indicator for use in face detection. Unfortunately, the "ground-truth" labels resulting from the use of either one of these factors will not be in perfect agreement for target faces.

Further, as noted above, the overall detection process generally operates by scanning the image and generating a large, but finite, collection of overlapping windows at various scales and locations. Further, even in the absence of scale/position ambiguity, some slop is required to ensure that at least one of the generated windows is considered a successful detection for each face (i.e., a positive window having a score passing the threshold, $\theta(T)$. Adding in unavoidable ambiguity in ground-truth position and scale, it is typical that any window which is within 50% in size and within a distance of 50% (of size) is considered a true positive. Using typical scanning parameters this can lead to a large number of windows for the same face which are all equally valid positive detections, where multiple windows for the same face have a score passing the threshold, $\theta(T)$. Therefore, if any of these windows is classified positive then the corresponding face is considered to be detected.

While most face detection algorithms see the issue of multiple positive windows for the same face, the issue is not typically addressed. A few conventional schemes have considered this issue within a "multiple instance learning" (MIL) framework where positive examples are collected into "bags." MIL-based schemes select one or more examples from each bag as the true positive examples for use in training the original combination classifier. In contrast, the Classifier Trainer modifies and adapts the concept of "bags" to learn the intermediate rejection thresholds described herein. In fact, the Classifier Trainer can construct the pruning classifier using an original combination classifier that was originally trained using an MIL style training algorithm (or any other cascade training algorithm, as noted above).

Given this concept of "bags" of acceptable windows, as discussed in the following paragraphs the Classifier Trainer improves on the DBP-based pruning process described in Section 3.2 by implementing a "multiple instance pruning" (MIP) based process for pruning examples from further consideration. In particular, given that there are a set of acceptable windows (i.e., a "bag") for each ground-truth face in an image, it is possible to set a more aggressive threshold for each weak classifier, as illustrated by Equation 2, where:

$$\theta(t) = \min_{\{i \in P\}} \left[ \max_{\{k | k \in F_i \cap R_i, y_k = 1\}} s_k(t) \right] \quad \text{Equation 2}$$

where i is the index of ground-truth faces; $F_i$ is the set of acceptable windows associated with ground-truth face i and $R_i$ is the set of windows which are "retained" (see below). P is the set of ground-truth faces that have at least one acceptable window above the final threshold:

$$P = \{i \mid \max_{\{k | k \in F_i\}} s_k(T) > \theta(T)\} \quad \text{Equation 3}$$

In this MIP-based pruning process, the positive examples come in bags, wherein only at least one of the positive examples in each bag must be classified as positive in order to ensure that each face is successfully detected. This criteria allows a more aggressive pruning of positive examples than the DBP-based approach described above, while still ensuring that the resulting intermediate rejection thresholds of the pruning classifier produced by the Classifier Trainer produce the same face detection success rate as the original combination classifier (with respect to the original training dataset).

In this case, the definition of "retained" examples used in the computation of Equation 2 and Equation 3 is somewhat more complex than described above for the case of DBP-based pruning. In particular, as with DBP-based pruning, all trajectories from the positive bags which fall above the final threshold are initially retained. However, in contrast to the DBP-based approach, the set of retained examples, $R_i$, in each bag is further reduced as the intermediate rejection thresholds are set by the Classifier Trainer. Specifically, the MIP-based pruning approach examines whether a partial score of an example falls below the current threshold of a particular weak classifier (because it is in a bag with a better example). Each such example is then removed from the retained set $R_i$ and not used to set subsequent thresholds.

In other words, for each bag of examples corresponding to a particular face, as the Classifier Trainer progresses through the weak classifiers of the original combination classifier, it will eliminate positive examples from each bag that have the lowest scores for a particular weak classifier. Then, once eliminated from a particular bag, that otherwise positive example is no longer considered with respect to subsequent weak classifiers. Clearly, this pruning approach is more aggressive than the aforementioned DBP-based pruning approach.

Note that in one embodiment, a small offset value, $\epsilon$, is subtracted from the minimum score for the positive examples in each bag for each particular weak classifier so that positive examples are not pruned from each bag too quickly. For example, by reducing the minimum score by some small amount, the Classifier Trainer will retain more positive examples in a bag if they are closer than the small value, $\epsilon$, for that particular weak classifier. In a tested embodiment, values of E on the order of about $10^{-6}$ were used. However, it should be noted that this value depends on the type of weak classifiers being used, and upon the relative values of the scores being generated by those weak classifiers.

The MIP-based pruning process described above is summarized by the pseudo-code illustrated in Table 1:

TABLE 1

Pseudo-Code for MIP-Based Pruning

Inputs:
1. Trained cascade detector (i.e., the "original combination classifier");
2. Threshold, $\theta(T)$, at the final stage of the original combination classifier; and
3. A large training data set (can be the same or different than data used for training the original combination classifier).

Initialize:
1. Run the original combination classifier on all rectangles (i.e., examples or windows) that match with any ground-truth faces;
2. Collect all windows that are above the final threshold $\theta(T)$;
3. Record all intermediate scores, $s(i,j,t)$, where $i = 1, \ldots, N$ is the face index; $j = 1, \ldots, M_i$ is the index of windows that match with face i (in other words, j identifies the "bag" for face i ); and $t = 1, \ldots, T$ is the index of the weak classifier node; and
4. Initialize flags $f(i,j)$ as true.

Prune:
  For $t = 1, \ldots, T$
    1. For $i = 1, \ldots, N$: Find. $\hat{s}(i,t) = \max_{\{j | f(i,j) = true\}} s(i,j,t)$.
    2. Set $\theta(t) = \hat{s}(i,t) - \epsilon$ as the rejection threshold of node t, where $\epsilon$ is on the order of about $10^{-6}$ (depending upon the type of weak classifier being used); and
    3. For $i = 1, \ldots, N$, and $j = 1, \ldots, M_i$: Set $f(i,j)$ as false if $s(i,j,t) < \theta(t)$ (i.e., remove the example from the bag if its score is below $\theta(t)$).

TABLE 1-continued

Pseudo-Code for MIP-Based Pruning

Output:
1. Intermediate rejection thresholds, $\theta(t), t = 1, \ldots, T$.

The rejection of a particular trajectory (and thus of a corresponding positive example from a particular bag) at an early stage may result in a higher rejection threshold for a subsequent weak classifier. Therefore, in a related embodiment, the Classifier Trainer delays elimination positive examples from particular bags while searching across various combinations of elimination order to achieve an optimally MIP pruned detector. However, this embodiment is likely to require significantly more computational overhead than the basic MIP-based pruning process.

Finally, it should be noted that even though the MIP-based pruning approach is more aggressive than the DBP-based pruning approach, it still guarantees the same face detection rate on the training dataset as the original combination classifier. Note that the MIP-based pruning approach is considered greedy, by setting each threshold in turn so that all positive bags are retained and the fewest number of positive examples pass to the final weak classifier. This procedure is guaranteed to generate a pruning classifier which is at least as fast as the DBP-based pruning classifier described in Section 3.2 (since the criteria for setting the thresholds is less restrictive). However, this procedure does not guarantee that the resulting pruning classifier is the fastest which satisfies the MIP criteria.

3.4 Weight Trimming and Bootstrapping:

The pruning processes described above can be applied to any conventional combination classifier (i.e., a classifier which is the sum of simpler functions, generally referred to herein as "weak classifiers"). However, in addition to conventional combination classifiers, the following paragraphs describe a novel process for learning a combination classifier from a very large set of training examples, potentially including millions, billions, or even larger numbers of samples. In order to deal with such large numbers of samples, the Classifier Trainer uses novel adaptations of both weight trimming and bootstrapping in various embodiments in combination with a novel weak classifier termed a "fat stump" classifier (see Section 3.5).

Conventionally, "weight trimming" is a concept used to improve "boosting" techniques for use in various learning algorithms. For example, at each round of boosting, conventional weight trimming ignores training examples with the smallest weights, up to a percentage of the total weight which is typically between 1% and 10%. Since the weights are typically very skewed toward a small number of hard examples, this can eliminate a very large number of examples. It has been shown that weight trimming can dramatically reduce computation for boosted methods without sacrificing accuracy. Further, another beneficial property of weight trimming is that examples are never thrown away completely, because even if a certain example is trimmed at one stage, it may return at a later stage. Since no example is discarded permanently, it is ideal for use in learning a combination classifier. In one embodiment, the learned combination classifier is then processed by the Classifier trainer to construct a pruning classifier from the combination classifier by learning intermediate rejection thresholds for each weak classifier of the combination classifier, as described above.

In general, as discussed below, the Classifier Trainer provides a cascade-based learning approach for large sets of training examples on the order of billions of examples by using a combination of periodic weight updates in combination with modified adaptive boosting (i.e., "AdaBoost") for training the original weak classifiers of an original combination classifier. Once this original combination classifier is learned using the weight trimming and bootstrapping techniques described below, the pruning techniques described above can then be applied to further improve the efficiency by constructing a new pruning classifier, as discussed above.

In particular, as illustrated by the pseudo-code of Table 2, the Classifier Trainer first initializes weights for a large input of examples, $\{(x_1, y_1), \ldots (x_K, y_K)\}$, where K is on the order of billions of examples. Weight updates on the entire set of examples is limited by predefining a set A which specifies a number of learning iterations to be performed on the whole training set between successive weight updates, with the update interval generally increasing over time as further updates have a reduced effect. Note that weight updates can be performed on scores of the whole training set after learning each weak classifier if desired. However, any performance gain resulting from additional updates may be offset by increased computational overhead.

The output from this learning process is a set of preliminary thresholds for the weak classifiers, making the result a soft-cascade. However, these preliminary rejection thresholds are extremely conservative, retaining all positive examples in the training set. They result in a very slow detector wherein the average number of weak classifiers visited per window is on the order of hundreds. However, as noted above, the Classifier Trainer learns new intermediate rejection thresholds for each weak classifier using the pruning techniques described above, thereby significantly improving overall performance of the resulting pruning classifier.

The learning process described above is summarized by the pseudo-code illustrated in Table 2:

TABLE 2

AdaBoost Learning with Weight-Trimming and Bootstrapping

Inputs:
1. Training examples $\{(x_1,y_1), \ldots (x_K,y_K)\}$, where $y_k = \{-1, 1\}$ for negative and positive examples, $x_K$, respectively; and
2. T is the total number of weak classifiers to be learned, which can be set through cross-validation, or specified via a user interface.

Initialize:
1. Take all positive examples from the set of training examples and randomly sample negative examples to form subset of Q examples, e.g., $Q = 10^6$;
2. Initialize weights $\omega_{1,i}$ to guarantee weight balance between positive and negative examples on the sampled dataset;
3. Define set A as desired weight update interval for updating all weights, e.g., $\{2, 4, 8, 16, 32, 64, 128, 256, \ldots\}$, etc.

Modified AdaBoost Learning:
For $t = 1, \ldots, T$
1. For each rectangle filter in a pool of filters, construct a "fat stump" classifier that minimizes a Z score, i.e., $Z_i = \sqrt{W_{+1}^i W_{-1}^i}$, under the current set of weights $\omega_{1,i}$, $i \in Q$ (see Section 3.5 and Table 3);
2. Select the best classifier $h_t$ with the minimum Z score, and find associated confidences $\alpha_t$.
3. Update weights of all Q sampled examples.
4. If $t \in A$:
   Update weights of the whole training set using the previously selected classifiers, $h_1, \ldots, h_t$.
   Perform weight trimming to trim desired percentage of the negative weights (on the order of about 1% to about 10%).
   Take all positive examples and randomly sample negative examples from trimmed training set to form new subset of Q examples.
5. Set preliminary rejection threshold $\theta(t)$ of $\Sigma_{j=1}^t \alpha_j h_j$ as the minimum score of all positive examples at stage t.

Output:
1. Series of weak classifiers $h_t$, $t = 1, \ldots, T$ (i.e., "fat stumps"), associated confidences, $\alpha_t$, and preliminary rejection thresholds, $\theta(t)$.

3.5 "Fat Stump" Weak Classifier:

As noted above, in various embodiments, a new type of weak classifier, referred to herein as a "fat stump" classifier is used in combination with the learning processes described in Section 3.4 to train an original combination classifier (i.e., a cascade detector), having preliminary rejection thresholds for each fat stump classifier. This fat stump weak classifier uses a variable bin size to significantly improve overall classification performance of the resulting cascade with a negligible increase in classification time.

In general, the fat stump classifier described herein represents a decision tree which performs a multi-way split based on multiple thresholds. For example, FIG. 5 provides an example of a conventional prior art look-up table (LUT) classifier using Haar features having fixed bin sizes (510 through 540). In contrast, FIG. 6 illustrates an example of a "fat stump" multi-threading classifier using Haar features with dynamically determined variable bin widths and positions (610 through 640).

Multi-thresholds can extract predictive value from a wider range of rectangle filters (for example a filter which is predictive of a face if its value is either very large or very small). As is known to those skilled in the art, using full decision trees as weak classifiers generally leads to an improvement in detection performance. Unfortunately, this comes with a measurable increase in detection time. It has been observed that detection performance can be improved by using a lookup table (LUT) with fixed bins instead of simple stumps (such as that illustrated by FIG. 5). However, when there are a large number of bins in the LUT there is typically too much flexibility which can lead to over-training. Conversely, when there are too few bins in the LUT conventional decision-tree-based learning algorithms do not perform better than simple stumps.

To address these issues, the Classifier Trainer provides fat stump classifiers that are iteratively learned by splitting the input range into a number of flexible, variably sized bins that eventually converge on an optimal size for each bin based on an iterative operation for maximizing a ratio of positive to negative examples in each variably sized bin. For each rectangle filter in a pool of filters, construct a "fat stump" classifier that minimizes a Z score under the current set of weights $\omega_{1,i}$, $i \in Q$ (see Table 3 for iteration pseudo-code). Note that convergence is guaranteed because, at each iteration, the Z score does not increase. In a tested embodiment, a maximum number of iterations was set as 5, however, it has been observed that 1 to 3 iterations are usually sufficient to achieve convergence. The resulting weak classifier is like a small decision tree; however, each node in the tree uses the same rectangle filter. This significantly improves the speed of each weak classifier while providing good detection performance.

The process for learning fat stump classifiers is summarized by the pseudo-code illustrated in Table 3:

TABLE 3

Learning a "Fat Stump" Weak Classifier

Inputs:
1. Histograms of weights of positive and negative examples for a certain weak classifier (see Section 3.4 and Table 2); and
2. Number of thresholds to be used, L.

Initialize:
1. Find a single threshold to minimize the Z score (a stump classifier);
2. Repeatedly split the segment with the highest partial Z score, where $Z_i = \sqrt{W_{+1}{}^i W_{-1}{}^i}$, using the same technique as for finding a single threshold.

Iterative Threshold Refinement:
Iterate till convergence or maximum number of iterations reached:
For i = 1, . . ., L:
1. Fix all other thresholds; adjust threshold $l_i$ locally to minimize the partial Z score.

Output:
1. Set of weak classifier thresholds $l_i$, i = 1, . . ., L, and confidence, $\alpha^i$, in each region given by $$\alpha^j = \frac{1}{2}\ln\left(\frac{w_{+1}^j + \epsilon}{w_{-1}^j + \epsilon}\right).$$

For example, in a tested embodiment, a set of these fat stump weak classifiers were constructed from a pool of 92,412 Haar-like rectangle filters. These rectangle filters were normalized by the variance of the detection window. Further, in one embodiment, the value of this window variance is provided as an additional "filter" which can be selected for use in a weak classifier. In addition, it should be this filter is available for use without requiring any additional computational overhead, since it has to be computed for each window for normalization anyway. Note that the first fat stump weak classifier always splits on variance.

Figure 7:
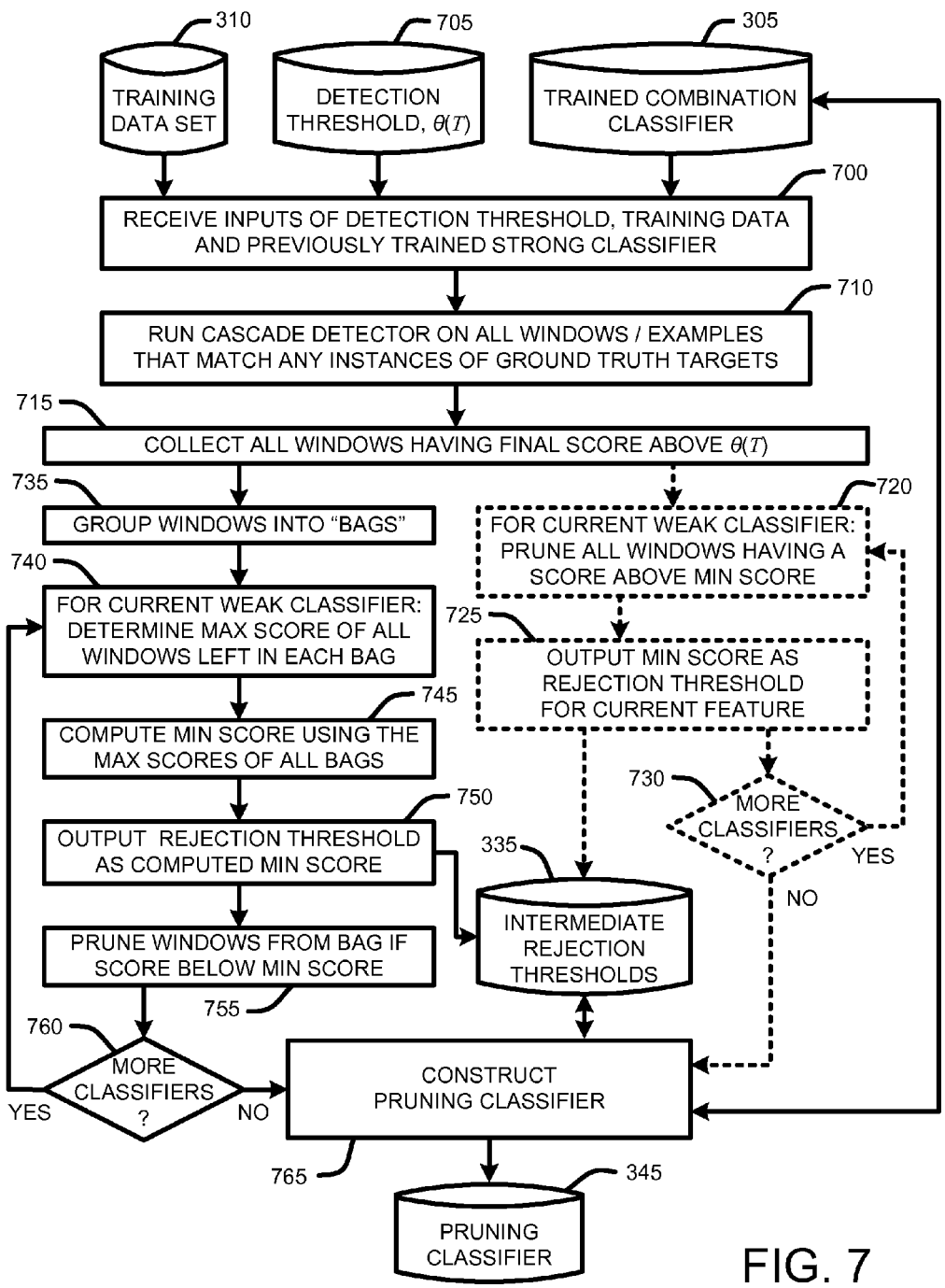
FIG. 7 provides an exemplary operational flow diagram that illustrates various embodiments for learning intermediate rejection thresholds for a pruning classifier, as described herein.

4.0 Operational Overview for Learning Rejection Thresholds:

Several of the various embodiments described above with respect to learning intermediate rejection thresholds are summarized by the operational flow diagram provided in FIG. 7.

Note that FIG. 7 is intended only as a general overview for learning intermediate rejection thresholds, and should be understood in view of FIG. 3, and FIG. 4, and in further view of the detailed description provided above in Section 2 and Section 3.

In particular, FIG. 7 provides an exemplary flow diagram that illustrates various embodiments for learning intermediate rejection thresholds given a trained original combination classifier (i.e., a cascade detector), the original training data set, and a final detection threshold. It should be noted that any boxes that are represented by broken or dashed lines in FIG. 7 represent alternate embodiments of the Classifier Trainer, and that any or all of these alternate embodiments, as described below, may be used in combination with other alternate embodiments that are described throughout this document.

For example, as illustrated by FIG. 7, the Classifier Trainer begins operation by receiving 700 inputs of the cascade detector detection threshold 705, the training data 310 used to train the cascade detector, and, of course, the previously trained cascade detector 305 (also referred to herein as the "original combination classifier").

Given these inputs, the Classifier Trainer runs 710 the cascade detector 305 on all windows of the training set 310 that match any ground truth targets. In other words, all positive examples are run through the cascade detector 305. When running these windows through the cascade detector 305, various pieces of information are retained. For example, a final detection score for each window is retained along with an intermediate score for each of the weak classifiers in the overall cascade. Given this information, the Classifier Trainer next collects 715 all windows having a final score exceeding the detection threshold set for the cascade detector 305.

In one embodiment (described above with respect to DBP or "direct backward pruning" embodiments), the Classifier Trainer next evaluates the collected windows for every weak classifier to prune 720 all intermediate scores above a minimum score seen at each individual weak classifier. These individual minimum scores are then output 725 to the set of intermediate rejection thresholds 335 for every classifier (loop 730).

In a related pruning embodiment (described above with respect to MIP or "multiple instance pruning") the Classifier Trainer collects 715 the windows/examples having a final score exceeding the detection threshold set for the cascade detector 305 then groups 735 those collected windows into "bags" of examples, wherein every window or example in a particular bag corresponds to a positive example of the same (i.e., multiple instance) ground truth target. For example, in the case of face detection, every window representing a positive example of the same exact face (i.e., same instance) in an image is placed into the same bag.

Next, for each weak classifier the Classifier Trainer determines 740 a maximum score for each window remaining in each bag. The Classifier Trainer then computes 745 a minimum score from the maximum scores of all bags for each weak classifier and outputs 750 this minimum score as the intermediate rejection threshold 335 of the current weak classifier. The Classifier Trainer prunes or eliminates 755 all windows from a particular bag that have a score less than the computed minimum score. (Note that as described above, this "minimum score" may be less than the actual minimum of the maximum scores since in one embodiment, a small offset value, $\epsilon$, is subtracted from the minimum score.) The process then continues by outputting 750 the individual intermediate rejection thresholds 335 for every weak classifier (loop 760). However, it should be noted that, as described above, once a window is pruned 755 from a particular bag, it is no longer available in the bag for evaluation (i.e., computing the max score for the bag) for any subsequent weak classifier.

Finally, regardless of which pruning embodiments are used, once the intermediate rejection thresholds 335 are learned for every weak classifier of the cascade detector 305, the Classifier Trainer uses these intermediate rejection thresholds to construct 765 the pruning classifier 345 as described above. The resulting pruning classifier 345 is then stored for later use in detecting targets using some cascade-based target detection application.

The foregoing description of the Classifier Trainer has been presented for purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Classifier Trainer. It is intended that the scope of the invention be limited not by this detailed description, but rather by the claims appended hereto.

What is claimed is:

1. A computer-readable medium having computer executable instructions stored thereon for automatically learning a set of weak classifiers of a combination classifier, said computer executable instructions comprising:
   receiving a set of positive examples and a set of negative examples of instances in one or more sets of training data;
   randomly sampling the set of negative examples to form a subset of negative examples;
   initializing a weight for each example of the set of positive examples and the subset of negative examples;
   for each of a predetermined number of weak classifiers, iteratively applying adaptive boosting-based learning to the set of positive examples and the subset of negative examples for a number of iterations to automatically learn a set of weak classifiers;
   iteratively weight trimming examples from the set of negative examples and reforming the subset of negative examples while iteratively applying adaptive boosting-based learning; and
   outputting the learned set of weak classifiers.

2. The computer-readable medium of claim 1 wherein the adaptive boosting-based learning comprises instructions for:
   applying a filter to each of the weighted positive and negative examples and forming a corresponding histogram of the filtered examples, each histogram representing one the weak classifiers;
   optimizing a ratio of the filtered positive and negative examples under the current weights;
   updating the weights of the examples in the subset of negative examples;
   updating the weights of the examples in the set of positive examples; and
   once all of the number of iterations have been completed, outputting each of the weak classifiers.

3. The computer-readable medium of claim 2 wherein optimizing the ratio of the positive and negative examples comprises minimizing a Z score of the positive and negative examples.

4. The computer-readable medium of claim 2 wherein the adaptive boosting-based learning and iterative weight trimming further comprises instructions for computing confidence values for each weak classifier.

5. The computer-readable medium of claim 1 further comprising defining a set of global weight update intervals.

6. The computer-readable medium of claim 5 wherein iteratively weight trimming examples and reforming the subset of negative examples are only performed if a current iteration of iteratively applying adaptive boosting-based learning is within the set of global weight update intervals.

7. The computer-readable medium of claim 1 wherein iteratively weight trimming examples comprises removing a desired percentage of the lowest weighted negative examples from the set of negative examples.

8. The computer-readable medium of claim 1 wherein initializing the weight for each example of the set of positive examples and the subset of negative examples comprises setting weights for each of those examples to create a weight balance between weighted positive and weighted negative examples.

9. A method for automatically learning a set of weak classifiers for constructing a combination classifier, comprising using a computing device to:
   receive a set of positive examples of instances represented in training data;
   receive a set of negative examples of the instances;
   form a subset of negative examples from the set of negative examples;
   set an initial weight for each positive example;
   set an initial weight for each negative example of the subset of negative examples;
   automatically learn a predetermined number of weak classifiers by iteratively applying adaptive boosting-based learning to the set of positive examples and the subset of negative examples for a predetermined number of iterations;
   iteratively weight trim examples from the set of negative examples and reform the subset of negative examples while iteratively applying the adaptive boosting-based learning; and
   constructing a combination classifier from the learned weak classifiers.

10. The method of claim 9 wherein the adaptive boosting-based learning further comprises:
    applying a filter to each of the weighted positive and negative examples and forming a corresponding histogram of the filtered examples, each histogram representing one the weak classifiers;
    optimizing a ratio of the filtered positive and negative examples under the current weights;
    updating the weights of the examples in the subset of negative examples;
    updating the weights of the examples in the set of positive examples;
    once all of the number of iterations have been completed, outputting each of the weak classifiers.

11. The method of claim 10 wherein optimizing the ratio of the positive and negative examples comprises minimizing a Z score of the positive and negative examples.

12. The method of claim 10 wherein the adaptive boosting-based learning and iterative weight trimming further comprises instructions for computing confidence values for each weak classifier.

13. The method of claim 9 further comprising defining a set of global weight update intervals.

14. The method of claim 13 wherein iteratively weight trimming examples and reforming the subset of negative examples are only performed if a current iteration of iteratively applying adaptive boosting-based learning is within the set of global weight update intervals.

15. The method of claim 9 wherein initializing the weight for each example of the set of positive examples and the subset of negative examples comprises setting weights for each of those examples to create a weight balance between weighted positive and weighted negative examples.

16. The method of claim 9 wherein the predetermined number of weak classifiers is specified via a user interface.

17. A process for learning a set of weak classifiers, comprising:

receiving a set of positive examples of instances represented in one or more sets of training data;

receiving a set of negative examples of the instances;

selecting from the set of negative examples to form a subset of negative examples;

weighting each positive example;

weighting each negative example of the subset of negative examples;

automatically learning a predetermined number of weak classifiers by iteratively applying adaptive boosting-based learning to the set of positive examples and the subset of negative examples for a predetermined number of iterations;

iteratively removing a desired percentage of the lowest weighted negative examples from the set of negative examples and reforming the subset of negative examples along with new weights for the negative examples while iteratively applying the adaptive boosting-based learning; and outputting the predetermined number of learned weak classifiers.

18. The process of claim 17 further comprising constructing a combination classifier from the learned weak classifiers.

19. The process of claim 17 wherein iteratively applying the adaptive boosting-based learning to the set of positive examples and the subset of negative examples comprises:

applying a windowed rectangular filter to each of the weighted positive and negative examples and forming a corresponding histogram of the filtered examples, each histogram representing one the weak classifiers;

optimizing a ratio of the filtered positive and negative examples under the current weights;

updating the weights of the examples in the subset of negative examples;

updating the weights of the examples in the set of positive examples; and after the predetermined number of iterations have been completed, outputting each of the weak classifiers.

20. The process of claim 17 wherein iteratively removing the desired percentage of the lowest weighted negative examples from the set of negative examples and reforming the subset of negative examples is only performed when a current iteration of iteratively applying adaptive boosting-based learning is within a predefined set of global weight update intervals.

* * * * *